(12) United States Patent
Brant et al.

(10) Patent No.: US 7,872,086 B2
(45) Date of Patent: Jan. 18, 2011

(54) POLYMERIC MATERIAL AND ITS MANUFACTURE AND USE

(75) Inventors: Patrick Brant, Seabrook, TX (US); Jeffrey L. Brinen, League City, TX (US); Zerong Lin, Kingwood, TX (US); Koichi Kono, Asaka (JP); Kohtaro Kimishima, Yokohama (JP); Hiroyuki Ozaki, Kamishinjo (JP)

(73) Assignee: Tonen Chemical Corporation, Tokyo (JP)

( * ) Notice: Subject to any disclaimer, the term of this patent is extended or adjusted under 35 U.S.C. 154(b) by 161 days.

(21) Appl. No.: 12/016,106

(22) Filed: Jan. 17, 2008

(65) Prior Publication Data

US 2009/0186279 A1 Jul. 23, 2009

(51) Int. Cl.
*C08F 10/06* (2006.01)
*C08F 4/72* (2006.01)

(52) U.S. Cl. .................. 526/351; 525/240; 526/348.5; 526/348.6; 526/916

(58) Field of Classification Search .............. 526/351, 526/348.5, 348.6, 916; 525/240
See application file for complete search history.

(56) References Cited

U.S. PATENT DOCUMENTS

| | | | |
|---|---|---|---|
| 4,413,110 A | 11/1983 | Kavesh et al. | |
| 4,734,196 A | 3/1988 | Kono et al. | |
| 5,070,051 A | 12/1991 | Masi et al. | |
| 5,304,614 A | 4/1994 | Winter et al. | |
| 5,430,119 A | 7/1995 | Kouya et al. | |
| 6,096,213 A | 8/2000 | Radovanovic et al. | |
| 6,214,949 B1 | 4/2001 | Reddy et al. | |
| 6,225,432 B1 | 5/2001 | Weng et al. | |
| 6,376,411 B1 | 4/2002 | Burkhardt et al. | |
| 6,399,707 B1 | 6/2002 | Meka et al. | |
| 6,686,433 B1 | 2/2004 | Miro et al. | |
| 2007/0264483 A1* | 11/2007 | Ozaki et al. ............. | 428/304.4 |

FOREIGN PATENT DOCUMENTS

| | | |
|---|---|---|
| CN | 1394907 | 2/2003 |
| EP | 0654476 | 5/1995 |
| EP | 0 704 462 | 4/1996 |
| EP | 0790076 | 8/1997 |
| EP | 1 544 218 | 6/2005 |
| JP | 62022808 | 1/1987 |
| JP | 02305809 | 12/1990 |
| JP | 03007704 | 1/1991 |
| JP | 91034465 | 5/1991 |
| JP | 06234811 | 8/1994 |
| JP | 06234812 | 8/1994 |
| JP | 07292021 | 11/1995 |
| JP | 09087412 | 3/1997 |
| WO | WO 96/04320 | 2/1996 |
| WO | WO 2001/29096 | 4/2001 |
| WO | WO 2001/42249 | 6/2001 |
| WO | WO 2003/49856 | 6/2003 |
| WO | WO2004/026921 | 4/2004 |
| WO | WO 2004/037871 | 5/2004 |
| WO | WO 2006/010139 | 1/2006 |
| WO | 2006/025540 | 3/2006 |
| WO | WO 2006/065664 | 6/2006 |

OTHER PUBLICATIONS

Brintzinger, Hans H. et al., "*Stereospecific Olefin Polymerization with Chiral Metallocene Catalysts,*" Angew. Chem. Int. Ed. Eng., vol. 34, Issue 11, pp. 1143-1170 (1995).
Kelly, J.M., "*Ultra-High Molecular Weight Polyethylene,*" Journal of Macromolecular Science, Part C, Polymer Reviews, vol.C42, No. 3, pp. 355-371 (2002).
Kristiansen, M. et al., "*Synergistic Gelation of Solutions of Isotactic Polypropylene and bis-(3,4-dimethyl benzylidene) Sorbitol and its Use in Gel-Processing,*" Polymer, vol. 44, pp. 5885-5891 (2003).
Lahelin, M. et al., "*Propylene Polymerization with rac-SiMe$_2$(2-Me-4-Phlnd)$_2$ZrMe$_2$/MAO: Polymer Characterization and Kinetic Models,*" Macromolecular Chemistry and Physics, vol. 204, pp. 1323-1337 (2003).
Resconi, L. et al., "*Selectivity in Propene Polymerization with Metallocene Catalysts,*" Chemical Review, vol. 100, pp. 1253-1345 (2000).
Spaleck, Walter et al., "*The Influence of Aromatic Substituents on the Polymerization Behavior of Bridged Zirconocene Catalysts,*" Organometallics, vol. 13, pp. 954-963 (1994).

* cited by examiner

*Primary Examiner*—Robert D. Harlan
(74) *Attorney, Agent, or Firm*—Gerard J. Hughes; Robert L. Abdon

(57) ABSTRACT

Disclosed herein is a polymer composition, its manufacture and use, said composition may comprise greater than about 90 mole % propylene monomer, and having a unique combination of properties, including one or more of the following: a heat of fusion of more than about 108 J/g, a melting point of 165° C. or higher, a Melt Flow Rate so low that it is essentially not measurable and a molecular weight of greater than about $1.5 \times 10^6$. Further disclosed herein are blends or mixtures of the present novel polymer composition and products, such as, for example, microporous film structures and the like comprising same.

16 Claims, No Drawings

POLYMERIC MATERIAL AND ITS MANUFACTURE AND USE

FIELD OF THE INVENTION

The invention relates to a polymeric composition comprising greater than about 90 mole % propylene monomer, and having a Melt Flow Rate at 230° C. of less than about 0.2 dg/minute. The polymeric composition is useful for producing microporous films, including microporous films containing polyethylene.

BACKGROUND OF THE INVENTION

Ultra high molecular weight ("UHMW") polymers have a variety of important commercial uses. For example, UHMW high density polyethylene ("UHMWPE") may be useful in products including ballistic protection fabrics, joint replacement materials and microporous films (WO 2004/026921A1 and U.S. Pat. No. 4,734,196). When used as battery separators, it is desired that the microporous films have well-balanced shutdown properties, meltdown temperatures, permeability, and pin puncture strength. Some forms of UHMW polypropylene ("UHMWPP") have been found to be useful in gel spun high melting and high strength fibers, as additives for manufacture of microporous films, and as additives to control melt rheology of lower molecular weight polypropylene.

UHMW polypropylene can be manufactured using a Ziegler-Natta catalyst and dicyclopentyldimethoxysilane as an electron donor. See, e.g., JP 06234811A, JP 06234812A and JP 07292021A. The first of these references discloses a product having an intrinsic viscosity of from 4 to 10 dl/g, and the second discloses a product having an intrinsic viscosity of from 5 to 10 dl/g and a Melt Flow Rate ("MFR") of less than 0.1 g/10 minutes. Both products are said to be useful for yarns with good break strength and modulus. The product from the third above reference is taught to have an average molecular weight of $1 \times 10^6$.

JP 62022808A discloses producing UHMW polypropylene having a molecular weight of from $2 \times 10^6$ to $5 \times 10^6$ using a Ziegler-Natta catalyst without the dicyclopentyldimethoxysilane electron donor. Similarly, JP 03007704A discloses producing polypropylene and copolymers having a molecular weight greater than $1 \times 10^6$ using a Ziegler-Natta catalyst without the dicyclopentyldimethoxysilane electron donor. JP 02305809A also discloses producing UHMW polypropylene without the electron donor in a Ziegler-Natta catalyzed polymerization.

U.S. Pat. No. 4,413,110 discloses polypropylene having a molecular weight of $2.1 \times 10^6$, which is disclosed as useful for high strength fibers. U.S. Pat. No. 5,070,051 discloses UHMW polyethylene and polyhexene, but not polypropylene, made using Ziegler-Natta catalyst without an dicyclopentyldimethoxysilane electron donor.

EP 0654476A and EP 0790076A disclose polypropylene made using metallocene catalyst. In the first of these reference, the product has a molecular weight of 786,500, a melting point of 159° C. and a molecular weight distribution ("Mw/Mn") of 2.4. The product of the second reference has a molecular weight of $1.1 \times 10^6$, a molecular weight distribution of 2.5 and a melting point of 159° C.

While polypropylene has been produced using metallocene catalysts, and Ziegler-Natta catalyst both with and without an dicyclopentyldimethoxysilane electron donor, the resulting polypropylene can be difficult to use for producing microporous films, particularly for producing microporous films containing polypropylene and polyethylene. For example, U.S. Pat. No. 6,096,213 discloses a microporous film produced from blends of melt-processable polymers, including blends of polyethylene and polypropylene. The patent discloses that polypropylene is considered melt processable only when it has a melt flow index above 0.2 dg/min.

There is therefore a need for an UHMWPP that can be used to produce microporous films such as those that contain polyethylene and polypropylene, particularly where the polypropylene has a melt flow index of 0.2 dg/min or less.

SUMMARY OF THE INVENTION

In an embodiment, the invention relates to an UHMWPP comprising greater than about 90 mole % propylene monomer, based on the weight of the UHMWPP. The UHMWPP generally has one or more of the following properties: an intrinsic viscosity greater than about 10 dl/g, a heat of fusion greater than about 108 J/g, a melting point of 165° C. or greater, a molecular weight greater than about $1.5 \times 10^6$, a molecular weight distribution of from about 2.5 to about 7, a Melt Flow Rate at 230° C. of less than about 0.01 dg/minute, i.e., essentially not measurable, an amount of extractable species (extractable by contacting the UHMWPP with xylene) of 0.5 wt. % or less based on the weight of the UHMWPP, a meso pentad fraction of greater than about 96 mol % mmmm pentads, and an amount of stereo defects less than about 50 per 10,000 carbon atoms. In a related embodiment, the UHMWPP comprises greater than about 90 mole % propylene monomer, based on the weight of the UHMWPP, has a Melt Flow Rate at 230° C. of less than about 0.01 dg/minute, and has at least one of the following properties: an intrinsic viscosity greater than about 10 dl/g, a heat of fusion greater than about 108 J/g, a melting point of 165° C. or greater, a molecular weight greater than about $1.5 \times 10^6$, a molecular weight distribution of from about 2.5 to about 7, an amount of extractable species (extractable by contacting the UHMWPP with xylene) of 0.5 wt. % or less based on the weight of the UHMWPP, a meso pentad fraction of greater than about 96 mol % mmmm pentads, and an amount of stereo defects less than about 50 per 10,000 carbon atoms.

In another embodiment, the invention relates to a polymeric composition comprising the foregoing UHMWPP. In a related embodiment, the polymeric composition further comprises (a) a second polymer (e.g., polyethylene such as high density and/or high molecular weight polyethylene) and/or (b) a diluent or solvent (e.g., liquid paraffin). In further related embodiments, the polymeric composition is a polyolefin composition comprising the foregoing UHMWPP and optionally one or more of high density polyethylene ("HDPE"), ultra-high molecular weight polyethylene ("UHMWPE"), a second polypropylene (e.g., one having a lower molecular weight than the UHMWPP), and diluent or solvent (which can be a mixture of diluents, solvents, or both). In another related embodiment, the invention relates to the polymeric composition and a second polymeric composition. The second polymeric composition can comprise polyolefin such as polyethylene and/or polypropylene, e.g., one or more of HDPE, UHMWPE, and the second polypropylene.

In another embodiment, the invention relates to a method for producing the foregoing UHMWPP and polymeric compositions. In still another embodiment, the invention relates to a process for using the foregoing UHMWPP or polymeric composition to produce an article, such as, for example, a shaped article, sheet, or film, e.g., a microporous film. It has been discovered that such a microporous film is particularly useful as a battery separator in, e.g., primary and secondary lithium ion batteries. Such batteries can be used as a source or sink of electric charge.

Accordingly, in yet another embodiment, the invention relates to a microporous membrane or film containing the foregoing UHMWPP or the polymeric composition. It has been discovered that microporous membranes used as battery separators which contain the foregoing UHMWPP or polymeric composition generally have well-balanced shutdown properties, meltdown temperatures, permeability and pin puncture strength.

The microporous membrane of the invention can be a single-layer membrane or a multi-layer membrane. Therefore, in one embodiment, the invention relates to a process for producing a microporous film, comprising:

a first microporous layer comprising a first layer material, a third microporous layer comprising the first layer material, and a second microporous layer containing a second layer material, the second microporous layer being located between the first and third microporous layers. At least one of the first or second layer materials is produced from the UHMWPP or the polymeric composition. Except for a relatively small amount of molecular weigh degradation that occurs during processing, e.g., from shear thinning, the layer material or materials produced from the UHMWPP or the polymeric composition will generally comprise the UHMWPP or polymeric composition from which they were produced.

In another embodiment, the invention relates to a method for producing a microporous membrane or film, comprising, (1) combining the foregoing UHMWPP (or polymeric composition) and a diluent (or process solvent) to form a first polyolefin solution, (3) extruding at least a portion of the first polyolefin solution through a die or dies to form an extrudate, (4) cooling the extrudate to form cooled extrudate, (5) removing at least a portion of the diluent from the cooled extrudate to form a solvent-removed sheet, and (6) removing at least a portion of any volatile species from the sheet to form the microporous membrane.

In a related embodiment, the invention relates to a process for producing a multi-layer membrane comprising (1) combining the foregoing UHMWPP or polymeric composition and a diluent (or process solvent) to form a first polyolefin solution, (2) combining a second polyolefin or polyolefin composition (optionally comprising the UHMWPP) and a second diluent (or process solvent) to form a second polyolefin solution, (3) extruding at least a portion of the first polyolefin solution through a die or dies and co-extruding at least a portion of the second polyolefin solution in order to form a multi-layer extrudate, (4) cooling the multi-layer extrudate to form a cooled multi-layer extrudate, (5) removing at least a portion of the process solvents from the cooled extrudate to form a solvent-removed sheet, and (6) removing at least a portion of any volatile species from the sheet to form the multi-layer, microporous membrane.

In an embodiment, the process is operated continuously or semi-continuously.

DETAILED DESCRIPTION OF THE INVENTION

The invention is based on the discovery of a polymeric composition comprising the foregoing UHMWPP, which polymeric composition is generally useful for producing articles such as microporous membranes. The polymer composition generally comprises greater than about 90 mole % propylene monomer and has one or more of the following desirable properties: an intrinsic viscosity greater than about 10 dl/g, a heat of fusion greater than about 108 J/g, a melting point of 165° C. or greater, a molecular weight greater than about $1.5 \times 10^6$, a molecular weight distribution of from about 2.5 to about 7, a Melt Flow Rate at 230° C. of less than about 0.01 dg/minute, i.e., essentially not measurable, an amount of extractable species (extractable by contacting the polymeric composition with boiling xylene) of 0.5 wt. % or less based on the weight of the polymeric composition, a meso pentad fraction of greater than about 96 mol % mmmm pentads, and an amount of stereo defects less than about 50 per 10,000 carbon atoms. In a related embodiment, the polymer composition comprises greater than about 90 mole % propylene monomer and has all of the following properties: an intrinsic viscosity greater than about 10 dl/g, a heat of fusion greater than about 108 J/g, a melting point of 165° C. or greater, a molecular weight greater than about $1.5 \times 10^6$, a molecular weight distribution of from about 2.5 to about 7, a Melt Flow Rate at 230° C. of less than about 0.01 dg/minute, i.e., essentially not measurable, an amount of extractable species (extractable by contacting the polymeric composition with boiling xylene) of 0.5 wt. % or less based on the weight of the polymeric composition, a meso pentad fraction of greater than about 96 mol % mmmm pentads, and an amount of stereo defects less than about 50 per 10,000 carbon atoms. It has been discovered that such polymeric compositions can be uses to produce microporous film, particularly microporous film containing polyethylene and polypropylene, even when the polypropylene melt flow rate is 0.2 dg/min or less, or even 0.1 dg/min or less, or even 0.01 dg/min or less.

The numbering of the Periodic Table of Elements Groups used herein can be found, for example, in Hawley's Condensed Chemical Dictionary 852 (John Wiley & Sons, 13th ed. 1997).

The term "polymer" as used herein refers to the product of a polymerization reaction, and is inclusive of homopolymers, copolymers, terpolymers, etc.

Unless otherwise specified, the term "copolymer(s)" as used herein refers to polymers formed by the polymerization of at least two different monomers. For example, the term "copolymer" includes the copolymerization reaction product of ethylene and an alpha-olefin ($\alpha$-olefin), such as by way of example only propylene or 1-hexene. However, the term "copolymer" is also inclusive of, for example, the copolymerization of a mixture of ethylene, propylene, 1-hexene, and 1-octene.

The term weight percent ("wt. %"), as used herein (unless noted otherwise), means a percent by weight of a particular component based on the total weight of the mixture containing the component. For example, if a mixture or blend contains three pounds of compound A and one pound of compound B, then the compound A comprises 75 wt. % of the mixture and the compound B comprises 25 wt. %.

I. Properties of the UHMWPP and the Polymeric Composition

In an embodiment, the polymeric composition comprises greater than about 90 mole % propylene monomer, such as, for example, greater than about 95 mole % propylene monomer, and up to greater than about 99.99 mole % propylene monomer.

In one form, the invention relates to polymeric compositions having one or more of the following properties. It may be appreciated that the properties can be characteristic of the polymeric composition or of the UHMWPP in the composition, particularly where the polymeric composition contains species besides the UHMWPP.

In an embodiment, the intrinsic viscosity of the polymeric composition is greater than about 11 dl/g, or alternatively greater than about 12 dl/g. The intrinsic viscosity (IV) of a polymeric composition can be determined, e.g., by the standard procedure outlined in "PREPARATIVE METHODS OF POLYMER CHEMISTRY", written by W. R. Sorenson and T. W. Campbell, pages 43-50, 2nd edition published by Interscience Publishers., 1968, or determined according to the ASTM D1601-78 procedure.

In an embodiment, the heat of fusion of the polymeric composition is greater than about 108 J/g, or more than about 110 J/g, or more than about 112 J/g. The heat of fusion for the polymeric composition can be determined by conventional methods, e.g., Differential Scanning Calorimetry (DSC).

In an embodiment, the polymeric composition has a high melting point (Tm), e.g., greater than about 166° C., or even greater than about 168° C., or even greater than about 170° C. The melting point can be determined by conventional methods, e.g., differential scanning calorimetry (DSC). Differential scanning calorimetric (DSC) data can be obtained as follows using a PerkinElmer Instrument, model Pyris 1 DSC. Samples weighing approximately 5.5-6.5 mg are sealed in aluminum sample pans. The DSC data are recorded by first heating the sample to 200° C. at a rate of 150° C./minute, called first melt (no data recorded). The sample is kept at 200° C. for 10 minutes before a cooling-heating cycle is applied. The sample is then cooled from 200° C. to 25° C. at a rate of 10° C./minute, called crystallization, and then kept at 25° C. for 10 minutes and heated to 200° C. at a rate of 10° C./minute, called second melt. The thermal events in both crystallization and second melt are recorded. The melting temperature ($T_m$) is the peak temperature of the second melting curve and the crystallization temperature ($T_c$) is the peak temperature of the crystallization peak.

In an embodiment, the polymeric composition has a relatively high molecular weight compared to that of polypropylene conventionally used to produce microporous membrane and film, particularly microporous film that also contain polyethylene. For example, the polymeric composition can have a molecular weight that is greater than about $1.75 \times 10^6$, or even greater than about $2 \times 10^6$, or even greater than about $2.25 \times 10^6$, such as, for example greater than about $2.5 \times 10^6$. The molecular weight distribution of the polymeric composition can be, e.g., within the relatively narrow range of from about 2.5 to about 7. As used herein, "molecular weight" means weight average molecular weight (Mw). Mw can be determined using Gel Permeation Chromatography as described below. Molecular Weight Distribution (MWD) means Mw divided by number average molecular weight (Mn). (For more information, see U.S. Pat. No. 4,540,753 to Cozewith et al. and references cited therein, and in Verstrate et al., 21 Macromolecules 3360 (1998)). The "Mz" value is the high average molecular weight value, calculated as discussed by A. R. Cooper in CONCISE ENCYCLOPEDIA OF POLYMER SCIENCE AND ENGINEERING 638-39 (J. I. Kroschwitz, ed. John Wiley & Sons 1990). Molecular weight distribution Mw/Mn ("MWD") is the ratio of weight average molecular weight ("Mw" as determined by gel permeation chromatography, hereinafter "GPC") to number average molecular weight ("Mn" as determined by GPC described below).

Molecular weight (weight-average molecular weight, Mw, and number-average molecular weight, Mn) can be determined using a High Temperature Size Exclusion Chromatograph (GPC PL 220, Polymer Laboratories), equipped with a differential refractive index detector (DRI). Three PLgel Mixed-B columns (Polymer Laboratories) are used. The nominal flow rate is 1.0 cm³/min, and the nominal injection volume is 300 µL. The various transfer lines, columns and the DRI detector are contained in an oven maintained at 160° C. This technique is discussed in "Macromolecules, Vol. 34, No. 19, pp. 6812-6820 (2001)" which is incorporated herein by reference.

Solvent for the GPC analysis is filtered Aldrich reagent grade 1,2,4-Trichlorobenzene (TCB) containing ~1000 ppm of butylated hydroxy toluene (BHT). The TCB is degassed with an online degasser before entering the SEC. Polymer solutions are prepared by placing dry polymer in a glass container, adding the desired amount of above TCB solvent, then heating the mixture at 160° C. with continuous agitation for about 2 hours. The concentration of UHMWPP solution is 0.25 mg/ml.

The separation efficiency of the column set is calibrated using a series of narrow MWD polystyrene standards, which reflects the expected MW range for samples and the exclusion limits of the column set. Eighteen individual polystyrene standards, ranging from Mp ~580 to 10,000,000, are used to generate the calibration curve. The polystyrene standards are obtained from Polymer Laboratories (Amherst, Mass.). A calibration curve (logMp vs. retention volume) is generated by recording the retention volume at the peak in the DRI signal for each PS standard, and fitting this data set to a 2nd-order polynomial. Samples are analyzed using WaveMetrics, Inc. IGOR Pro.

The following Mark-Houwink coefficients are used to calculate PP base Mw and PS base MW respectively.

|    | k (dL/g)         | α     |
|----|------------------|-------|
| PS | 1.75 × 10−4      | 0.67  |
| PP | 2.288 × 10−4     | 0.705 |

In an embodiment, the polymeric composition has a Melt Flow Rate (MFR) at 230° C. and 2.16 kg weight of 0.2 dg/min or less, or alternatively less than about 0.1 dg/min, or even less than about 0.01 dg/min. A value of 0.01 dg/min is low enough that the MFR is essentially not measurable. Melt Flow Rate can be determined in accordance with conventional methods, such as ASTM D 1238-95 Condition L.

In an embodiment, the polymeric composition exhibits stereo defects of less than about 50 per 10,000 carbon atoms, or less than about 40, or less than about 30, or even less than about 20 per 10,000 carbon atoms. For example, the polymeric composition can have fewer than about 10, or fewer than about 5 stereo defects per 10,000 carbon atoms. Stereo defects can be measured by conventional methods, such as the following $^{13}C$ NMR method:

$^{13}C$ NMR data is obtained at 100 MHz at 125° C. on a Varian VXR 400 NMR spectrometer. A 90° C. pulse, an acquisition time of 3.0 seconds, and a pulse delay of 20 seconds are employed. The spectra are broad band decoupled and acquired without gated decoupling. Similar relaxation times and nuclear Overhauser effects are expected for the methyl resonances of polypropylenes, which are generally the only homopolymer resonances used for quantitative purposes. A typical number of transients collected is 2500. The sample is dissolved in tetrachlorethane-$d_2$ at a concentration of 15% by weight. All spectral frequencies are recorded with respect to an internal tetramethylsilane standard. In the case of polypropylene homopolymer, the methyl resonances are recorded with respect to 21.81 ppm for mmmm, which is close to the reported literature value of 21.855 ppm for an internal tetramethylsilane standard. The pentad assignments used are well established.

In an embodiment, the polymeric composition has a meso pentad fraction of greater than about 96 mol % mmmm pentads.

In an embodiment, the polymeric composition contains an amount of extractable species (extractable by contacting the polymeric composition with boiling xylene) of 0.5 wt. % or less, or 0.2 wt. % or less, or even 0.1 wt. % or less based on the weight of the polymeric composition. The amount of extractable species (such as relatively low molecular weight and/or amorphous material, e.g., amorphous polypropylene) is determined by solubility in xylene at 135° C., according to the following procedure. Weigh out 2 grams of sample (either in pellet or ground pellet form) into 300 ml conical flask. Pour 200 ml of xylene into the conical flask with stir bar and secure the flask on a heating oil bath. Turn on the heating oil bath and allow melting of the polymer by leaving the flask in oil bath at 135° C. for about 15 minutes. When melted, discontinue heating, but continue stirring through the cooling process. Allow the dissolved polymer to cool spontaneously overnight. The precipitate is filtered with Teflon filter paper and then dried under vacuum at 90° C. The quantity of xylene soluble is determined by calculating the percent by weight of total polymer sample ("A") less precipitate ("B") at room temperature [soluble content=((A−B)/A)×100].

II. Producing the UHMWPP and the Polymeric Composition

The polymeric composition, e.g., the UHMWPP, can be produced according to the following methods using process conditions that are generally conventional for producing olefinic polymers, such as solution polymerization, slurry polymerization or gas phase polymerization techniques, with liquid-phase polymerization being a preferred technique. Similarly, the olefin polymers may be produced using a suitable polyolefin catalyst system, including conventional systems such as Zeigler-Natta catalysts or metallocene catalysts. Examples of suitable catalsyts and process conditions are disclosed in European Patent No. 0350170B2, which is incorporated by reference herein, except that no added hydrogen is used.

Ziegler-Natta-type catalysts are conventional, and are discussed, for example, by in *Concise Encyclopedia of Polymer Science and Engineering*, 1087-1107 (Jacqueline I. Kroschwitz ed., 1990) and by F. A. Cotton & G. Wilkinson, *Advanced Inorganic Chemistry*, 1280-1282 (4th ed. 1980). Typical solid magnesium supported catalyst systems and preparations thereof are outlined in U.S. Pat. Nos. 4,990,479 and 5,159,021, and WO 00/44795. For example, Ziegler-Natta catalysts are typically composed of a transition metal compound from groups 4-7 and an organometallic compound of a metal from groups 11-13 of the periodic table. Well-known examples include $TiCl_3$-$Et_2AlCl$, $AlR_3$—$TiCl_4$ wherein Et is an ethyl group and R represents an alkyl group. These catalysts include mixtures of halides of transition metals, especially titanium, chromium, vanadium, and zirconium, with organic derivatives of nontransition metals, particularly alkyl aluminum compounds. The Ziegler-Natta-type catalysts are usually combined with an electron donor. Electron donors may be used in two ways in the formation of a Ziegler-Natta catalyst system. First, an internal electron donor may be used in the formation reaction of the solid catalyst. Examples of internal electron donors include: amines, amides, ethers, esters, aromatic esters, ketones, nitriles, phosphines, stibines, arsines, phosphoramides, thioethers, thioesters, aldehydes, alcoholates, and salts of organic acids. The second use for an electron donor in a catalyst system is as an external electron donor and stereoregulator in the polymerization reaction. The same compound may be used in both instances, although typically they are different. Organic silicon compounds including conventional organic silicon compounds can be used as electron donors. Examples of conventional electron donors that are organic silicon (or "silane") compounds are disclosed in U.S. Pat. Nos. 4,218, 339; 4,395,360; 4,328,122; 4,473,660; 6,133,385 and 6,127, 303. A description of the two types of electron donors is provided in U.S. Pat. No. 4,535,068.

In an embodiment, the polymeric compositions is produced in the liquid-phase with a Zeigler-Natta catalyst comprising $TiCl_4$/MgCl, an internal electron donor comprising di-n-butyl phthalate, an electron donor comprising dicyclopentyldimethoxy silane (DCPMS) and little or no added hydrogen. The method comprises the steps of (1) Precontacting the Ziegler-Natta catalyst with the DCPMS donor and triethyl aluminum (TEAl), (2) prepolymerizing the catalyst with propylene, (3) further polymerizing the prepolymerized catalyst in one or more reactors, and (4) recovering a polymeric composition comprising greater than about 90 mole % propylene monomer, the polymeric composition having a combination of properties including an intrinsic viscosity greater than about 10 dl/g, a heat of fusion greater than about 108 J/g, a melting point of 165° C. or greater, a molecular weight greater than about $1.5 \times 10^6$, a molecular weight distribution of from about 2.5 to about 7, a Melt Flow Rate at 230° C. of less than about 0.01 dg/minute, i.e., essentially not measurable, an amount of extractable species (extractable by contacting the polymeric composition with boiling xylene) of 0.5 wt. % or less based on the weight of the polymeric composition, a meso pentad fraction of greater than about 96 mol % mmmm pentads, and an amount of stereo defects less than about 50 per 10,000 carbon atoms. In an embodiment, the polymeric composition comprises the UHMWPP of the invention. In another embodiment, the polymeric composition consists essentially of the UHMWPP. In yet another embodiment, the polymeric composition consists of the UHMWPP. In an embodiment that is particularlry useful for making the polymeric composition (e.g., the UHMWPP of the invention) for use in producing microporous film containing polyethylene, the following conditions can be used: no added hydrogen is used in the polymerization process, the polymerization catalyst is TOHO THC-135, and the electron donor is dicyclopentyldimethoxysilane; with the remaining process conditions being as disclosed in European Patent No. 0350170B2.

In addition to the preferred DCPMS donor mentioned above, other acceptable donors may include, without limitation, di(t-butyl)dimethoxysilane, cyclopentyldimethoxy(t-butoxy)silane, (t-butyl)(t-butoxy)dimethoxysilane.

III. Using the Polymeric Composition to Produce an Article of Manufacture

In an embodiment, the polymeric composition can be combined with a second polymeric composition, e.g., by mixing or blending, to produce an article of manufacture, such as a microporous film. For example, the polymeric composition can be mixed or blended with polyethylene, e.g., in the form of a polyethylene resin.

(a) Starting Materials

When the polymeric composition is combined with a second polymeric composition, the relative amounts of the first and second polymeric compositions are not critical. For example, the percent ratio of the polymeric composition to the second polymeric composition in the mix or blend may be, for example, from about 5 to about 95 wt. %, or from about 20 to about 80 wt. %, based on the weight of the combined first and second polymeric compositions. The second polymeric composition can comprise polyolefin, e.g., one or more of a high density (HD) polyethylene and/or a high molecular weight polyethylene, e.g., an ultra high molecular weight (UHMW) polyethylene, or a second polypropylene. In such mixtures or blends the weight ratio of the polymeric composition to HD polyethylene to high molecular weight, e.g., UHMW, polyethylene can be, for example, 5 to 95:0 to 95:0 to 95, or alternatively, 20 to 80:20 to 70:0 to 20. The amount of second polypropylene, when present, is not critical, and can be in the range, e.g., of from about 10 wt. % to about 30 wt. %., based on the combined weight of the first and second polymeric compositions.

In an embodiment, the second polymeric composition comprises at least one of a first polyethylene, a second polyethylene, or the second polypropylene. The first polyethylene can be, e.g., a polyethylene having a molecular weight of $5\times10^5$ or more, e.g., a molecular weight of from $1\times10^6$ to $1.5\times10^7$, such as UHMWPE. Such a polyethylene can be an ethylene homopolymer or an ethylene/$\alpha$-olefin copolymer containing a small amount of an $\alpha$-olefin other than ethylene. The $\alpha$-olefin other than ethylene may be propylene, butene-1, hexene-1, pentene-1, 4-methylpentene-1, octene, vinyl acetate, methyl methacrylate, styrene, or a mixture thereof.

The second polyethylene can be a polyethylene having an Mw molecular weight in the range of about $1\times10^4$ to about $5\times10^5$. The second polyethylene can be, for example, high-density polyethylene, medium-density polyethylene, branched low-density polyethylene, and linear low-density polyethylene. The second polyethylene can be an ethylene homopolymer or an ethylene/$\alpha$-olefin copolymer containing a small amount of an $\alpha$-olefin other than ethylene. The $\alpha$-olefin other than ethylene may be propylene, butene-1, hexene-1, pentene-1, 4-methylpentene-1, octene, vinyl acetate, methyl methacrylate, styrene or a mixture thereof. Although it is not critical, the second polyethylene can have terminal unsaturation of, e.g., two or more per 10,000 carbon atoms in the polyethylene. Terminal unsaturation can be measured by, e.g., conventional infrared spectroscopic methods.

The second polypropylene can be polypropylene having a weight average molecular weight of less than about $7.5\times10^5$, e.g., from about $1\times10^4$ to about $7.5\times10^5$, or from about $4.5\times10^5$ to about $7.5\times10^5$, or from about $5\times10^5$ to about $7\times10^5$. Although it is not critical, the second polypropylene can have a molecular weight distribution of from, e.g., about 5 to about 100, such as from about 5 to about 50, and a heat of fusion of about 80 J/g or higher, for example from about 80 to about 120 J/g. The second polypropylene can be, for example, one or more of (i) a propylene homopolymer or (ii) a copolymer of propylene and one or more of $\alpha$-olefins such as ethylene, butene-1, pentene-1, hexene-1, 4-methylpentene-1, octene-1, vinyl acetate, methyl methacrylate, and styrene, etc.; and diolefins such as butadiene, 1,5-hexadiene, 1,7-octadiene, 1,9-decadiene, etc., in an amount of less than 10% by mole based on 100% by mole of the entire copolymer. The copolymer can be a random or block copolymer. Optionally, the second polypropylene has one or more of the following properties: (i) the polypropylene is isotactic; (ii) the polypropylene has a heat of fusion of at least about 90 J/g, for example from about 90 to about 120 J/g; (iii) the polypropylene has a melting peak (second melt) of at least about 160° C.; (iv) the polypropylene has a Trouton's ratio of at least about 15 when measured at a temperature of about 230° C. and a strain rate of 25 sec$^{-1}$; and/or (v) the polypropylene has an elongational viscosity of at least about 50,000 Pa sec at a temperature of 230° C. and a strain rate of 25 sec$^{-1}$.

In one embodiment, the invention relates to a composition comprising from about 1 wt. % to about 95 wt. % of the polymeric composition, from 0 to about 95 wt. % of the first polyethylene, from 0 to about 95 wt. % of the second polyethylene, and from about 0 to about 50 wt. % of the second polypropylene. In a related embodiment, the invention relates to a composition comprising the UHMWPP of the invention in an amount in the range of from about 10 wt. % to about 80 wt. %, or from about 20 wt. % to about 40 wt. %; UHMWPE in an amount in the range of from about 0 to about 20 wt. %, or about 5 wt. % to about 15 wt. %; HDPE in an amount in the range of from about 10 to about 80 wt. %, or about 20 wt. % to about 70 wt. %; and the second polypropylene in an amount in the range of from about 0 wt. % to about 50 wt. %, or about 10 wt. % to about 30 wt. %.

The polymer composition, either alone or in combination with a second polymer or polymer composition, can optionally further comprise an effective amount of a stabilizer to prevent color formation. Conventional stabilizers, i. e., those are known in the art, are suitable. Such stabilizers include phosphorus oxo acids, acid organo phosphates, acid organo phosphates, acid phosphate metal salts, acidic phosphate metal salts and mixtures thereof.

The polymer composition, either alone or in combination with a second polymer or polymer composition, can optionally further comprise an effective amount of a colored pigment. Conventional colored pigments are suitable, including carbon black, phthalocyanine blues, phthalocyanine greens, anthraquinone dyes, scarlet 2b Lake, azo compounds, acid azo pigments, quinacridones, chromophthalocyanine pyrrols, halogenated phthalocyanines, quinolines, heterocyclic dyes, perinone dyes, anthracenedione dyes, thiozanthene dyes, parazolone dyes, polymethine pigments, and mixtures thereof.

The polymer composition, either alone or in combination with a second polymer or polymer composition, can optionally further comprise additives or compounds to provide the compositions with particular, desirably characteristics. Conventional additives and compounds are suitable, and their use is well within the skill of one in the art. Examples of such include UV stabilizers, anti-oxidants, light stabilizers, flame retardants, antistatic agents, biocides, viscosity-breaking agents, impact modifiers, plasticizers, fillers, reinforcing agents, lubricants, mold release agents, blowing agents, nucleating agents and the like.

(b) Structure of a Microporous Film Produced From the UHMWPP or the Polymeric Composition.

In an embodiment, the microporous membrane is a monolayer membrane. The choice of production method is not critical, and any method capable of forming a microporous membrane from polyolefin starting materials can be used, including conventional methods such as those such as those described in U.S. Pat. No. 5,051,183 and in U.S. Pat. No. 6,096,213 which are incorporated by reference herein in their entirety. In another embodiment, the microporous membrane is multi-layer membrane, i.e., one having at least two layers. For the sake of brevity, the production of the microporous polyolefin membrane will be mainly described in terms of two-layer and three-layer membranes, although those skilled in the art will recognize that the same techniques can be applied to the production of membranes or membranes having one layer or those having at least four layers.

In an embodiment, the three-layer microporous membrane comprises first and third microporous layers constituting the outer layers of the microporous polyolefin membrane and a second layer situated between (and optionally in planar contact with) the first and third layers. In an embodiment, the first and third layers are produced from a first polyolefin solution and the second (or inner) layer is produced from a second polyolefin solution. In another embodiment, the first and third layers are produced from the second polyolefin solution and the second layer is produced from the first polyolefin solution.

In an embodiment, the microporous membrane or at least one of the layers of a multi-layer microporous membrane exhibit a hybrid structure characterized by a relatively wide pore size distribution. Such The microporous membrane can be produced according to the method disclosed in WO 2007/117042, which is incorporated by reference herein. Microporous membranes produced by the above-described method have a relatively wide pore size distribution when plotted as a differential pore volume curve. Pore size distribution can be measured, e.g., by conventional methods such as mercury porosimetry methods representing data as a differential pore volume curve.

When mercury porosimetry is used to measure the distribution of pore sizes and pore volume in the membrane, it is conventional to measure pore diameter, pore volume, and the specific surface area of the membrane. The measurements can be used to determine a differential pore volume expressed as $$\frac{dVp}{d\mathrm{Log}(r)}$$

where Vp is the pore volume, and r is the pore radius, assuming cylindrical pores. The differential pore volume when plotted on the y axis with pore diameter on the x axis is conventionally referred to as the "pore size distribution." For membranes exhibiting a hybrid structure, at least about 25%, or at least about 30%, or at least about 40%, or at least about 50%, or at least about 60%, of the differential pore volume is associated with pores that are about 100 nanometers in size (diameter) or larger. In other words, for the curve of $$\frac{dVp}{d\mathrm{Log}(r)}$$

vs. pore diameter, the fraction of the area under the curve from a pore diameter of about 100 nanometers to about 1,000 nanometers is at least about 25%, or at least about 30%, or at least about 40%, or at least about 50%, or at least about 60% of the total area under that curve for pore sizes (or diameters assuming cylindrical pores) of from about 10 nanometers to about 1,000 nanometers. In an embodiment, the area under the curve for pore diameters of from about 100 nanometers to about 1,000 nanometers is in the range of about 25% to about 60%, or about 30% to about 55%, or about 35% to about 50% of the total area under the curve for pore diameters of from about 10 nanometers to about 1,000 nanometers.

One mercury intrusion porosimetry method that can be used to determine the microporous membrane structure utilizes a Pore Sizer 9320 (Micromeritics Company, Ltd.), a pressure range of from 3.6 kPa to 207 MPa, and a cell volume of 15 cm$^3$. For the measurements, a contact angle of mercury of 141.3 and a surface tension of mercury of 484 dynes/cm can be used. The parameters obtained by this include pore volume, surface area ratio, peak top of pore size, average pore size and porosity. References disclosing this method include Raymond P. Mayer and Robert A. Stowe, J. Phys. Chem. 70,12(1966); L. C. Drake, Ind. Eng. Chem., 41,780(1949); H. L. Ritter and L. C. Drake, Ind. Eng. Chem. Anal., 17,782 (1945) and E. W. Washburn, Proc. Nat. Acad. Sci., 7,115 (1921).

The membrane is useful as a battery separator. The membrane is particularly useful as a separator for lithium and lithium ion batteries, e.g., primary and secondary lithium ion batteries. Representative batteries and battery separators useful in the invention are described in WO2007/117042.

(c) Method for Producing a Microporous Membrane Using the UHMWPP or the Polymeric Composition In an embodiment, the invention relates to a method for producing a microporous membrane comprising the steps of (1) combining a diluent or solvent (which can be referred to as a membrane-forming solvent) and a first polyolefin composition comprising the UHMWPP or the polymeric composition to prepare a first polyolefin solution, (2) optionally (used when a multi-layer membrane is desired) combining a second polyolefin composition and a second membrane-forming solvent to prepare a second polyolefin solution, (3) extruding (preferably simultaneously) the first and second polyolefin solutions through at least one die to form an extrudate, (4) optionally cooling the extrudate to form a cooled extrudate, e.g., a gel-like sheet, (5) removing at east a portion of the membrane-forming solvent from the cooled extrudate or extrudate to form a solvent-removed sheet, and (6) removing any volatile species from the sheet, e.g., by drying, to form the microporous membrane. An optional stretching step (7), and an optional hot solvent treatment step (8), etc. can be conducted between steps (4) and (5), if desired. After step (6), an optional step (9) of stretching a multi-layer, microporous membrane, an optional heat treatment step (10), an optional cross-linking step with ionizing radiation (11), and an optional hydrophilic treatment step (12), etc., can be conducted if desired. The order of the optional steps is not critical. The first and second solutions are referred to as "polyolefin" solutions because they contain polyolefin. First and second solutions that further comprise species that are not polyolefin are within the scope of the invention.

(1) Preparation of First Polyolefin Solution

The first polyolefin composition comprises the UHMWPP or the polymeric composition and other polyolefin if desired (generally in the form of resins as described above) which are combined, e.g., by dry mixing or melt blending with an appropriate diluent (e.g., a membrane-forming solvent) to produce the first polyolefin solution. Optionally, the first polyolefin solution can contain various additives such as one or more antioxidant, fine silicate powder (pore-forming material), etc., provided these are used in a concentration range that does not significantly degrade the desired properties of the multi-layer, microporous polyolefin membrane. In an embodiment, the first polyolefin composition comprises the UHMWPP or the polymeric composition, and optionally one or more of the first polyethylene, the second polyethylene, and the second polypropylene. The polyolefin resins of the first polyolefin composition are selected to produce the desired microporous layer or layers, e.g., one or more core layers or one or more skin layers of the microporous membrane.

The first diluent or solvent (e.g., a process solvent or membrane-forming solvent) can be a solvent that is liquid at room temperature. While not wishing to be bound by any theory or model, it is believed that the use of a liquid solvent to form the first polyolefin solution makes it possible to conduct stretching of the gel-like sheet at a relatively high stretching magnification. In an embodiment, the first membrane-forming solvent can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates liquid at room temperature such as dibutyl phthalate, dioctyl phthalate, etc. In an embodiment where it is desired to obtain a multi-layer, gel-like sheet having a stable liquid solvent content, non-volatile liquid solvents such as liquid paraffin can be used, either alone or in combination with other solvents. Optionally, a solvent which is miscible with polyethylene in a melt blended state but solid at room temperature can be used, either alone or in combination with a liquid solvent. Such solid solvent can include, e.g., stearyl alcohol, ceryl alcohol, paraffin waxes, etc. Although it is not critical, it can be more difficult to evenly stretch the gel-like sheet or resulting membrane when the solution contains no liquid solvent.

The viscosity of the liquid solvent is not a critical parameter. For example, the viscosity of the liquid solvent can range from about 30 cSt to about 500 cSt, or from about 30 cSt to about 200 cSt, at 25° C. Although it is not a critical parameter, when the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the liquid solvent from the multi-layer microporous polyolefin membrane.

In an embodiment, the resins, etc., used to produce to the first polyolefin composition are dry mixed or melt-blended in, e.g., a double screw extruder or mixer. For example, a conventional extruder (or mixer or mixer-extruder) such as a double-screw extruder can be used to combine the resins, etc., to form the first polyolefin composition. The membrane-forming solvent can be added to the polyolefin composition (or alternatively to the resins used to produce the polyolefin composition) at any convenient point in the process. For example, in an embodiment where the first polyolefin composition and the first membrane-forming solvent are melt-blended, the solvent can be added to the polyolefin composition (or its components) at any of (i) before starting melt-blending, (ii) during melt blending of the first polyolefin composition, or (iii) after melt-blending, e.g., by supplying the first membrane-forming solvent to the melt-blended or partially melt-blended polyolefin composition in a second extruder or extruder zone located downstream of the extruder zone used to melt-blend the polyolefin composition.

When melt-blending is used, the melt-blending temperature is not critical. For example, the melt-blending temperature of the first polyolefin solution can range from about 10° C. higher than the melting point $Tm_1$ of the first polyethylene resin to about 120° C. higher than $Tm_1$. For brevity, such a range can be represented as $Tm_1+10°$ C. to $Tm_1+120°$ C. In an embodiment where the first polyethylene resin has a melting point of about 130° C. to about 140° C., the melt-blending temperature can be in the range of from about 140° C. to about 250° C., or from about 170° C. to about 240° C.

When an extruder such as a double-screw extruder is used for melt-blending, the screw parameters are not critical. For example, the screw can be characterized by a ratio L/D of the screw length L to the screw diameter D in the double-screw extruder, which can range, for example, from about 20 to about 100, or from about 35 to about 70. Although this parameter is not critical, when L/D is less than about 20, melt-blending can be more difficult, and when L/D is more than about 100, faster extruder speeds might be needed to prevent excessive residence time of the polyolefin solution in the double-screw extruder (which can lead to undesirable molecular weight degradation). Although it is not a critical parameter, the cylinder (or bore) of the double-screw extruder can have an inner diameter of in the range of about 40 mm to about 100 mm, for example.

The amount of the first polyolefin composition in the first polyolefin solution is not critical. In an embodiment, the amount of first polyolefin composition in the first polyolefin solution can range from about 1 wt. % to about 75 wt. %, based on the weight of the polyolefin solution, for example from about 20 wt. % to about 70 wt. %. Although the amount of first polyolefin composition in the first polyolefin solution is not critical, when the amount is less than about 1 wt. %, it can be more difficult to produce the multi-layer microporous polyolefin membrane at an acceptably efficient rate. Moreover, when the amount is less than 1 wt. %, it can be more difficult to prevent swelling or neck-in at the die exit during extrusion, which can make it more difficult to form and support the multi-layer, gel-like sheet, which is a precursor of the membrane formed during the manufacturing process. On the other hand, when the amount of first polyolefin composition solution is greater than about 75 wt. %, it can be more difficult to form the multi-layer, gel-like sheet.

(2) Preparation of Second Polyolefin Solution

The second polyolefin solution can be prepared by the same methods used to prepare the first polyolefin solution. For example, the second polyolefin solution can be prepared by melt-blending a second polyolefin composition with a second diluent or solvent. The second membrane-forming solvent can be selected from among the same solvents as the first membrane-forming solvent. And while the second membrane-forming solvent can be (and generally is) selected independently of the first membrane-forming solvent, the second membrane-forming solvent can be the same as the first membrane-forming solvent, and can be used in the same relative concentration as the first membrane-forming solvent is used in the first polyolefin solution.

The second polyolefin composition is generally selected independently of the first polyolefin composition. The second polyolefin composition generally comprises one or more of the first polyethylene, the second polyethylene, the first polypropylene, and the second polypropylene.

In an embodiment where the polyolefin composition contains the second polypropylene, the method for preparing the second polyolefin solution differs from the method for preparing the first polyolefin solution, only in that the mixing temperature is preferably in a range from the melting point (Tm2) of the second polypropylene to Tm2+90° C., and that the polyolefin composition content is preferably 1-50% by mass, more preferably 20-40% by mass. When the process produces a multi-layer microporous membrane, e.g., a three-layer membrane, the membrane can comprise a first microporous layer comprising a first layer material, a third microporous layer comprising the first layer material, and a second microporous layer containing a second layer material, the second microporous layer being located between the first and third microporous layers. In an embodiment, the first layer material is produced from the first polyolefin solution and the second layer material is produced from the second polyolefin solution. In another embodiment, the second layer material is produced from the first polyolefin solution and the first layer material is produced from the second polyolefin solution.

(3) Extrusion

In an embodiment, the first polyolefin solution is conducted from a first extruder to a first die, and, optionally, the second polyolefin solution is conducted from a second extruder to a second die. A monolayer extrudate, or a layered extrudate if desired, in sheet form (i.e., a body significantly larger in the planar directions than in the thickness direction) can be extruded from the first and optionally the second die. Optionally, the first and second polyolefin solutions are co-extruded from the first and second die with a planar surface of a first extrudate layer formed from the first polyolefin solution in contact with a planar surface of a second extrudate layer formed from the second polyolefin solution. A planar surface of the extrudate can be defined by a first vector in the machine direction of the extrudate and a second vector in the transverse direction of the extrudate.

In another embodiment, a plurality of dies is used, with each die connected to an extruder for conducting either the first or second polyolefin solution to the die. For example, in one embodiment, the first extruder containing the first polyolefin solution is connected to a first die and a third die., and a second extruder containing the second polyolefin solution is connected to a second die. As is the case in the preceding embodiment, the resulting layered extrudate can be co-extruded from the first, second, and third die (e.g., simultaneously) to form a three-layer extrudate comprising a first and a third layer constituting surface layers (e.g., top and bottom layers) produced from the first polyolefin solution; and a second layer constituting a middle or intermediate layer of the extrudate situated between and in planar contact with both surface layers, where the second layer is produced from the second polyolefin solution.

In yet another embodiment, the same die assembly is used but with the polyolefin solutions reversed, i.e., the second extruder containing the second polyolefin solution is connected to the first die and the third die, and the first extruder containing the first polyolefin solution is connected to the second die.

In any of the preceding embodiments, die extrusion can be conducted using conventional die extrusion equipment. For example, extrusion can be conducted by a flat die or an inflation die. In one embodiment useful for co-extrusion of multi-layer gel-like sheets, multi-manifold extrusion can be used, in which the first and second polyolefin solutions are conducted to separate manifolds in a multi-layer extrusion die and laminated at a die lip inlet. In another such embodiment, block extrusion can be used, in which the first and second polyolefin solutions are first combined into a laminar flow (i.e., in advance), with the laminar flow then connected to a die. Because multi-manifold and block processes are known to those skilled in the art of processing polyolefin films (e.g., as disclosed in JP06-122142 A, JP06-106599A), they are deemed conventional, therefore, their operation will be not described in detail.

Die selection is not critical, and, e.g., a conventional multi-layer-sheet-forming, flat or inflation die can be used. Die gap is not critical. For example, the multi-layer-sheet-forming flat die can have a die gap of about 0.1 mm to about 5 mm. Die temperature and extruding speed are also non-critical parameters. For example, the die can be heated to a die temperature ranging from about 140° C. to about 250° C. during extrusion. The extruding speed can range, for example, from about 0.2 m/minute to about 15 m/minute. The thickness of the layers of the layered extrudate can be independently selected. For example, the gel-like sheet can have relatively thick surface layers (or "skin" layers) compared to the thickness of an intermediate layer of the layered extrudate.

While the extrusion has been described in terms of embodiments producing one, two, and three-layer extrudates, the extrusion step is not limited thereto. For example, a plurality of dies and/or die assemblies can be used to produce multi-layer extrudates having four or more layers using the extrusion methods of the preceding embodiments. In such a layered extrudate, each surface or intermediate layer can be produced using either the first polyolefin solution and/or the second polyolefin solution.

(4) Formation of a Cooled Extrudate

The extrudate can be formed into a gel-like sheet by cooling, for example. Cooling rate and cooling temperature are not particularly critical. For example, the gel-like sheet can be cooled at a cooling rate of at least about 50° C./minute until the temperature of the gel-like sheet (the cooling temperature) is approximately equal to the gel-like sheet's gelation temperature (or lower). In an embodiment, the extrudate is cooled to a temperature of about 25° C. or lower in order to form the gel-like sheet. While not wishing to be bound by any theory or model, it is believed that cooling the layered extrudate sets the polyolefin micro-phases of the first and second polyolefin solutions for separation by the membrane-forming solvent or solvents. It has been observed that in general a slower cooling rate (e.g., less than 50° C./minute) provides the multi-layer, gel-like sheet with larger pseudo-cell units, resulting in a coarser higher-order structure. On the other hand, a relatively faster cooling rate (e.g., 80° C./minute) results in denser cell units. Although it is not a critical parameter, when the cooling rate of the extrudate is less than 50° C./minute, increased polyolefin crystallinity in the layer can result, which can make it more difficult to process the multi-layer, gel-like sheet in subsequent stretching steps. The choice of cooling method is not critical. For example conventional sheet cooling methods can be used. In an embodiment, the cooling method comprises contacting the layered extrudate with a cooling medium such as cooling air, cooling water, etc. Alternatively, the extrudate can be cooled via contact with rollers cooled by a cooling medium, etc.

(5) Removal of the First and Second Membrane-forming Solvents

In an embodiment, at least a portion of the first and second membrane-forming solvents are removed (or displaced) from the gel-like sheet in order to form a solvent-removed sheet. A displacing (or "washing") solvent can be used to remove (wash away, or displace) the first and second membrane-forming solvents. While not wishing to be bound by any theory or model, it is believed that because the polyolefin phases in the gel-like sheet produced from the first polyolefin solution and the second polyolefin solution (i.e., the first polyolefin and the second polyolefin) are separated from the membrane-forming solvent phase, the removal of the membrane-forming solvent provides a porous membrane constituted by fibrils forming a fine three-dimensional network structure and having pores communicating three-dimensionally and irregularly. The choice of washing solvent is not critical provided it is capable of dissolving or displacing at least a portion of the first and/or second membrane-forming solvent. Suitable washing solvents include, for instance, one or more of volatile solvents such as saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc.

The method for removing the membrane-forming solvent is not critical, and any method capable of removing a significant amount of solvent can be used, including conventional solvent-removal methods. For example, the multi-layer, gel-like sheet can be washed by immersing the sheet in the washing solvent and/or showering the sheet with the washing solvent. The amount of washing solvent used is not critical, and will generally depend on the method selected for removal of the membrane-forming solvent. For example, the amount of washing solvent used can range from about 300 to about 30,000 parts by mass, based on the mass of the gel-like sheet. While the amount of membrane-forming solvent removed is not particularly critical, generally a higher quality (more porous) membrane will result when at least a major amount of first and second membrane-forming solvent is removed from the gel-like sheet. In an embodiment, the membrane-forming solvent is removed from the gel-like sheet (e.g., by washing) until the amount of the remaining membrane-forming solvent in the gel-like sheet becomes less than 1 wt. %, based on the weight of the gel-like sheet.

(6) Drying the Sheet

In an embodiment, the solvent-removed sheet obtained by removing at least a portion of the membrane-forming solvent is dried in order to remove the washing solvent. Any method capable of removing the washing solvent can be used, including conventional methods such as heat-drying, wind-drying (moving air), etc. The temperature of the gel-like sheet during drying (i.e., drying temperature) is not critical. For example, the drying temperature can be equal to or lower than the crystal dispersion temperature Tcd. Tcd is the lower of the crystal dispersion temperature $Tcd_1$ of the first polyethylene resin and the crystal dispersion temperature $Tcd_2$ of the second polyethylene resin (when used). For example, the drying temperature can be at least 5° C. below the crystal dispersion temperature Tcd. The crystal dispersion temperature of the first and second polyethylene resin can be determined by measuring the temperature characteristics of the kinetic viscoelasticity of the polyethylene resin according to ASTM D 4065. In an embodiment, at least one of the first or second polyethylene resins have a crystal dispersion temperature in the range of about 90° C. to about 100° C.

Although it is not critical, drying can be conducted until the amount of remaining washing solvent is about 5 wt. % or less on a dry basis, i.e., based on the weight of the dry microporous polyolefin membrane. In another embodiment, drying is conducted until the amount of remaining washing solvent is about 3 wt. % or less on a dry basis. Insufficient drying can be recognized because it generally leads to an undesirable decrease in the porosity of the microporous membrane. If this is observed, an increased drying temperature and/or drying time should be used. Removal of the washing solvent, e.g., by drying or otherwise, results in the formation of the, microporous membrane.

(7) Stretching

Prior to the step for removing the membrane-forming solvents (namely prior to step 5), the sheet can be stretched in order to obtain a stretched, gel-like sheet. It is believed that the presence of the first and second membrane-forming solvents in the gel-like sheet results in a relatively uniform stretching magnification. Heating the gel-like sheet, especially at the start of stretching or in a relatively early stage of stretching (e.g., before 50% of the stretching has been completed) is also believed to aid the uniformity of stretching.

Neither the choice of stretching method nor the degree of stretching magnification are particularly critical. For example, any method capable of stretching the gel-like sheet to a predetermined magnification (including any optional heating) can be used. In an embodiment, the stretching can be accomplished by one or more of tenter-stretching, roller-stretching, or inflation stretching (e.g., with air). Although the choice is not critical, the stretching can be conducted monoaxially (i.e., in either the machine or transverse direction) or biaxially (both the machine or transverse direction). In an embodiment, biaxial stretching is used. In the case of biaxial stretching (also called biaxial orientation), the stretching can be simultaneous biaxial stretching, sequential stretching along one planar axis and then the other (e.g., first in the transverse direction and then in the machine direction), or multi-stage stretching (for instance, a combination of the simultaneous biaxial stretching and the sequential stretching). In an embodiment, simultaneous biaxial stretching is used.

The stretching magnification is not critical. In an embodiment where monoaxial stretching is used, the linear stretching magnification can be, e.g., about 2 fold or more, or about 3 to about 30 fold. In an embodiment where biaxial stretching is used, the linear stretching magnification can be, e.g., about 3 fold or more in any planar direction. In another embodiment, the area magnification resulting from stretching is at least about 9 fold, or at least about 16 fold, or at least about 25 fold. Although it is not a critical parameter, when the stretching results in an area magnification of at least about 9 fold, the multi-layer microporous polyolefin membrane has a relatively higher pin puncture strength. When attempting an area magnification of more than about 400 fold, it can be more difficult to operate the stretching apparatus.

The temperature of the gel-like sheet during stretching (namely the stretching temperature) is not critical. In an embodiment, the temperature of the gel-like sheet during stretching can be about (Tm+10° C.) or lower, or optionally in a range that is higher than Tcd but lower than Tm, wherein Tm is the lesser of the melting point $Tm_1$ of the first polyethylene and the melting point $Tm_2$ of the second polyethylene (when used). Although this parameter is not critical, when the stretching temperature is higher than approximately the melting point Tm+10° C., at least one of the first or second polyethylene can be in the molten state, which can make it more difficult to orient the molecular chains of the polyolefin in the gel-like sheet during stretching. And when the stretching temperature is lower than approximately Tcd, at least one of the first or second polyethylene can be so insufficiently softened that it is difficult to stretch the multi-layer, gel-like sheet without breakage or tears, which can result in a failure to achieve the desired stretching magnification. In an embodiment, the stretching temperature ranges from about 90° C. to about 140° C., or from about 100° C. to about 130° C.

While not wishing to be bound by any theory or model, it is believed that such stretching causes cleavage between polyethylene lamellas, making the polyethylene phases finer and forming large numbers of fibrils. The fibrils form a three-dimensional network structure (three-dimensionally irregularly connected network structure). Consequently, the stretching when used generally makes it easier to produce a relatively high-mechanical strength microporous membrane with a relatively large pore size. Such multi-layer, microporous membranes are believed to be particularly suitable for use as battery separators.

Optionally, stretching can be conducted in the presence of a temperature gradient in a thickness direction (i.e., a direction approximately perpendicular to the planar surface of the microporous polyolefin membrane). In this case, it can be easier to produce a microporous polyolefin membrane with improved mechanical strength. The details of this method are described in Japanese Patent 3347854.

(8) Hot Solvent Treatment Step

Although it is not required, the multi-layer, gel-like sheet can be treated with a hot solvent between steps (4) and (5). When used, it is believed that the hot solvent treatment provides the fibrils (such as those formed by stretching the multi-layer gel-like sheet) with a relatively thick leaf-vein-like structure. Such a structure, it is believed, makes it less difficult to produce a multi-layer, microporous membrane having large pores with relatively high strength and permeability. The term "leaf-vein-like" means that the fibrils have thick trunks and thin fibers extending therefrom in a network structure. The details of this method are described in WO 2000/20493.

(9) Stretching of Multi-layer, Microporous Membrane ("Dry Stretching")

In an embodiment, the dried microporous membrane of step (6) can be stretched, at least monoaxially. The stretching method selected is not critical, and conventional stretching methods can be used such as by a tenter method, etc. While it is not critical, the membrane can be heated during stretching. While the choice is not critical, the stretching can be monoaxial or biaxial. When biaxial stretching is used, the stretching can be conducted simultaneously in both axial directions, or, alternatively, the multi-layer, microporous polyolefin membrane can be stretched sequentially, e.g., first in the machine direction and then in the transverse direction. In an embodiment, simultaneous biaxial stretching is used. When the sheet has been stretched as described in step (7) the stretching of the dry microporous membrane in step (9) can be called dry-stretching, re-stretching, or dry-orientation.

The temperature of the dry, microporous membrane during stretching (the "dry stretching temperature") is not critical. In an embodiment, the dry stretching temperature is approximately equal to the melting point Tm or lower, for example in the range of from about the crystal dispersion temperature Tcd to the about the melting point Tm. When the dry stretching temperature is higher than Tm, it can be more difficult to produce a microporous membrane having a relatively high compression resistance with relatively uniform air permeability characteristics, particularly in the transverse direction when the dry multi-layer, microporous polyolefin membrane is stretched transversely. When the stretching temperature is lower than Tcd, it can be more difficult to sufficiently soften the first and second polyolefins, which can lead to tearing during stretching, and a lack of uniform stretching. In an embodiment, the dry stretching temperature ranges from about 90° C. to about 135° C., or from about 95° C. to about 130° C.

When dry-stretching is used, the stretching magnification is not critical. For example, the stretching magnification of the multi-layer, microporous membrane can range from about 1.1 fold to about 1.8 fold in at least one planar (e.g., lateral) direction. Thus, in the case of monoaxial stretching, the stretching magnification can range from about 1.1 fold to about 1.8 fold in the longitudinal direction (i.e., the "machine direction") or the transverse direction, depending on whether the membrane is stretched longitudinally or transversely. Monoaxial stretching can also be accomplished along a planar axis between the longitudinal and transverse directions.

In an embodiment, biaxial stretching is used (i.e., stretching along two planar axis) with a stretching magnification of about 1.1 fold to about 1.8 fold along both stretching axes, e.g., along both the longitudinal and transverse directions. The stretching magnification in the longitudinal direction need not be the same as the stretching magnification in the transverse direction. In other words, in biaxial stretching, the stretching magnifications can be selected independently. In an embodiment, the dry-stretching magnification is the same in both stretching directions. If desired, the membrane can be stretched to a magnification that is larger than 1.8 fold, particularly when during subsequent processing (e.g., heat treatment) the membrane relaxes (or shrinks) in the direction(s) of stretching to a achieve a final magnification of about 1.1 to about 1.8 fold compared to the size of the film at the start of the dry orientation step.

(10) Heat Treatment

In an embodiment, the dried microporous membrane can be heat-treated following step (6). It is believed that heat-treating stabilizes the polyolefin crystals in the dried multi-layer, microporous membrane to form uniform lamellas. In an embodiment, the heat treatment comprises heat-setting and/or annealing. When heat-setting is used, it can be conducted using conventional methods such as tenter methods and/or roller methods. Although it is not critical, the temperature of the dried microporous membrane during heat-setting (i.e., the "heat-setting temperature") can range from the Tcd to about the Tm. In an embodiment, the heat-setting temperature ranges from about the dry stretching temperature of the multi-layer, microporous polyolefin membrane ±5° C., or about the dry stretching temperature of the multi-layer, microporous polyolefin membrane ±3° C.

Annealing differs from heat-setting in that it is a heat treatment with no load applied to the multi-layer, microporous polyolefin membrane. The choice of annealing method is not critical, and it can be conducted, for example, by using a heating chamber with a belt conveyer or an air-floating-type heating chamber. Alternatively, the annealing can be conducted after the heat-setting with the tenter clips slackened. The temperature of the microporous polyolefin membrane during annealing (i.e., the annealing temperature) is not critical. In an embodiment, the annealing temperature ranges from about the melting point Tm or lower, or in a range from about 60° C. to (Tm—10° C.). It is believed that annealing makes it less difficult to produce a microporous membrane having relatively high permeability and strength.

(11) Cross-linking

In an embodiment, the multi-layer, microporous polyolefin membrane can be cross-linked (e.g., by ionizing radiation rays such as α-rays, β-rays, γ-rays, electron beams, etc.) after step (6). For example, when irradiating electron beams are used for cross-linking, the amount of electron beam radiation can be about 0.1 Mrad to about 100 Mrad, using an accelerating voltage in the range of about 100 kV to about 300 kV. It is believed that the cross-linking treatment makes it less difficult to produce a microporous membrane with relatively high meltdown temperature.

(12) Hydrophilizing Treatment

In an embodiment, the microporous membrane can be subjected to a hydrophilic treatment (i.e., a treatment which makes the microporous polyolefin membrane more hydrophilic). The hydrophilic treatment can be, for example, a monomer-grafting treatment, a surfactant treatment, a corona-discharging treatment, etc. In an embodiment, the monomer-grafting treatment is used after the cross-linking treatment.

When a surfactant treatment is used, any of nonionic surfactants, cationic surfactants, anionic surfactants and amphoteric surfactants can be used, for example, either alone or in combination. In an embodiment, a nonionic surfactant is used. The choice of surfactant is not critical. For example, the multi-layer, microporous polyolefin membrane can be dipped in a solution of the surfactant and water or a lower alcohol such as methanol, ethanol, isopropyl alcohol, etc., or coated with the solution, e.g., by a doctor blade method.

EXAMPLES

The presently described and claimed polymers will be understood more fully by reference to the Examples below without intention of restricting the scope of the present claims.

Continuous Polymerization Examples

Example 1

Samples were produced by continuous polymerization in a loop slurry pilot plant facility. The unit design includes an in-situ prepolymerization facility, two six-inch loop reactors in series, and a granules handling train. The catalyst solids, TOHO THC-135, were fed via syringe pump to the precontacting vessel, where it was combined with the electron donor-dicyclopentyldimethoxysilane (DCPMS) and triethyl aluminum (TEAl). The molar feed ratios of the three catalyst components are presented in Table 1. Following prepolymerization at 65° F., the prepolymerized catalyst was fed to the main reactors. The reaction conditions used to produce all of the samples are presented in Table 1. The characterization results for the samples are presented in Table 2.

TABLE 1

Polymerization Conditions used for the preparation of the UHMW-PP samples.

| Sample | Lead Reactor | | | Tail Reactor | | | Catalyst Feed | | Production | |
|---|---|---|---|---|---|---|---|---|---|---|
| | T (F) | P (PSIG) | $H2_{feed}$ (mol PPM) | T (F) | P (PSIG) | $H2_{feed}$ (mol PPM) | Si/Ti (mol ratio) | Al/Ti (mol ratio) | Rate (lb/hr) | Efficiency (lb/lb cat) |
| 2-1 | 158.0 | 526.7 | 253.0 | 158.1 | 525.4 | 330.1 | 25.6 | 101.0 | 54.8 | 41,897 |
| 4-1 | 158.0 | 526.2 | 142.4 | 158.1 | 525.0 | 313.7 | 25.2 | 102.4 | 50.5 | 41,530 |
| 4-25 | 158.0 | 525.8 | 102.3 | 157.9 | 524.7 | 221.5 | 27.0 | 106.4 | 50.6 | 41,390 |
| 4-26 | 158.0 | 526.4 | 136.2 | 158.0 | 525.1 | 441.1 | 26.4 | 109.8 | 54.7 | 44,843 |
| 4-28 | 158.0 | 525.3 | 158.1 | 157.9 | 523.9 | 412.5 | 26.1 | 111.2 | 56.5 | 46,277 |
| 5-11 | 158.0 | 526.1 | 100.7 | 158.1 | 524.8 | 156.9 | 25.6 | 110.0 | 58.5 | 47,399 |
| 5-12 | 158.1 | 523.6 | 123.9 | 158.0 | 522.2 | 194.2 | 23.9 | 107.1 | 63.0 | 48,545 |
| 5-13 | 158.0 | 521.3 | 107.1 | 158.0 | 520.0 | 179.6 | 23.6 | 104.6 | 55.7 | 42,870 |
| 8-1 | 158.0 | 526.5 | 7.19 | 158.0 | 525.1 | 7.71 | 26.0 | 94.7 | 45.9 | 17,971 |
| 8-2 | 158.1 | 526.5 | 7.68 | 158.1 | 525.2 | 6.94 | 28.0 | 95.0 | 55.8 | 21,259 |
| 8-3 | 157.9 | 526.5 | 6.64 | 157.9 | 525.1 | 7.43 | 27.8 | 99.0 | 65.1 | 24,771 |
| 8-4 | 158.0 | 526.6 | 7.58 | 158.0 | 525.2 | 6.12 | 28.4 | 98.4 | 69.8 | 28,587 |
| 8-5 | 158.0 | 526.4 | 8.27 | 158.0 | 525.1 | 7.31 | 29.6 | 98.2 | 61.7 | 27,529 |
| 8-6 | 158.7 | 526.5 | 7.50 | 158.7 | 525.1 | 6.58 | 29.7 | 98.8 | 53.1 | 23,676 |
| 9-1 | 165.0 | 526.4 | 7.80 | 164.9 | 525.1 | 6.02 | 29.3 | 96.7 | 57.7 | 22,095 |
| 9-2 | 165.0 | 526.5 | 6.88 | 165.0 | 525.2 | 9.19 | 29.2 | 97.6 | 61.1 | 25,239 |
| 9-3 | 165.0 | 526.4 | 6.50 | 165.0 | 525.1 | 5.79 | 29.4 | 95.9 | 61.3 | 25,282 |
| 9-4 | 165.0 | 526.5 | 6.94 | 165.2 | 525.1 | 7.85 | 31.6 | 75.6 | 51.9 | 21,399 |
| 10-1 | 165.0 | 526.5 | 8.41 | 165.0 | 525.2 | 7.84 | 60.1 | 124.2 | 36.1 | 20,080 |
| 10-2 | 165.0 | 526.5 | 8.30 | 165.0 | 525.2 | 7.39 | 60.3 | 113.5 | 42.3 | 23,551 |
| 10-3 | 165.0 | 526.5 | 7.92 | 165.0 | 525.2 | 6.61 | 54.5 | 106.2 | 56.0 | 30,563 |
| 10-4 | 165.0 | 526.4 | 7.79 | 165.0 | 525.2 | 7.01 | 54.1 | 104.9 | 53.6 | 28,676 |
| 10-6 | 165.0 | 526.4 | 7.13 | 165.0 | 525.1 | 6.93 | 57.1 | 112.1 | 52.1 | 30,935 |
| 10-7 | 165.0 | 526.4 | 6.08 | 165.0 | 525.1 | 9.05 | 56.3 | 108.4 | 43.4 | 26,109 |
| 10-8 | 165.0 | 526.5 | 9.10 | 165.0 | 525.2 | 9.90 | 47.6 | 95.1 | 53.1 | 28,142 |
| 10-9 | 165.0 | 526.5 | 7.54 | 165.0 | 525.2 | 7.47 | 48.1 | 96.8 | 51.5 | 27,344 |
| 10-10 | 161.5 | 526.4 | 7.07 | 161.5 | 525.1 | 6.56 | 46.6 | 97.4 | 54.0 | 28,753 |
| 11-1 | 158.0 | 526.4 | 6.62 | 158.0 | 525.0 | 5.64 | 29.8 | 98.5 | 50.5 | 25,584 |
| 11-2 | 158.0 | 526.3 | 6.62 | 158.0 | 525.0 | 6.80 | 29.1 | 97.4 | 55.4 | 22,613 |
| 11-3 | 158.0 | 526.3 | 6.13 | 158.0 | 524.9 | 7.09 | 28.8 | 97.6 | 64.2 | 23,488 |
| 11-4 | 158.0 | 526.3 | 7.02 | 158.0 | 524.9 | 6.48 | 30.1 | 98.6 | 73.7 | 25,318 |
| 11-5 | 158.0 | 526.3 | 5.90 | 158.0 | 525.0 | 8.31 | 30.0 | 98.6 | 71.5 | 24,569 |
| 11-6 | 158.0 | 526.4 | 6.40 | 158.0 | 525.0 | 6.59 | 31.1 | 97.0 | 74.0 | 25,509 |
| 11-7 | 158.0 | 526.3 | 7.37 | 158.0 | 525.0 | 6.82 | 32.4 | 99.0 | 65.7 | 22,593 |
| 11-8 | 158.0 | 526.3 | 6.16 | 158.0 | 524.9 | 7.27 | 32.3 | 98.2 | 69.7 | 24,037 |

TABLE 2

Characterization Results

| Sample | GPC Data | | | | | DSC Data (run at 160° C.) | | |
| --- | --- | --- | --- | --- | --- | --- | --- | --- |
| | $M_n$ | $M_w$ | $M_z$ | $M_w/M_n$ | $M_z/M_w$ | $T_c$ | $T_m$ | $\Delta H_{2nd\,melt}$ |
| 2-1 | | | | | | 110.4 | 166.5 | |
| 4-1 | | | | | | 110.9 | 166.4 | |
| 4-25 | 284,622 | 1,116,115 | 2,784,586 | 3.921 | 2.495 | 108.9 | 167.3 | |
| 4-26 | 253,314 | 1,058,606 | 2,605,484 | 4.179 | 2.461 | 109.3 | 167.2 | |
| 4-28 | 236,906 | 1,013,416 | 2,559,084 | 4.278 | 2.525 | 107.2 | 167.3 | |
| 5-11 | 271,271 | 1,286,818 | 3,145,858 | 4.744 | 2.445 | 108 | 167.4 | |
| 5-12 | 278,450 | 1,260,087 | 3,044,149 | 4.525 | 2.416 | 103.3 | 170.5 | |
| 5-13 | 282,281 | 1,221,237 | 2,954,388 | 4.326 | 2.419 | 108.5 | 167 | |
| 8-1 | 538,453 | 2,507,248 | 4,912,427 | 4.656 | 1.959 | | | |
| 8-2 | 679,104 | 2,706,388 | 5,181,996 | 3.985 | 1.915 | | | |
| 8-3 | 493,536 | 2,371,032 | 4,811,511 | 4.804 | 2.029 | 113.9 | 168.5 | 106.3 |
| 8-4 | 676,084 | 2,609,119 | 5,014,015 | 3.859 | 1.922 | 114.0 | 168.5 | 106.7 |
| 8-5 | 578,458 | 2,469,363 | 4,912,367 | 4.269 | 1.989 | | | |
| 8-6 | 548,847 | 2,295,717 | 4,596,040 | 4.183 | 2.002 | | | |
| 9-1 | 549,515 | 2,314,742 | 4,547,995 | 4.212 | 1.965 | | | |
| 9-2 | 544,751 | 2,396,423 | 4,730,467 | 4.399 | 1.974 | 113.6 | 169.0 | 103.8 |
| 9-3 | 560,778 | 2,524,893 | 4,947,423 | 4.502 | 1.959 | 113.7 | 168.6 | 104.8 |
| 9-4 | 547,492 | 2,370,769 | 4,779,957 | 4.330 | 2.016 | | | |
| 10-1 | 660,526 | 2,605,372 | 4,916,287 | 3.944 | 1.887 | | | |
| 10-2 | 499,009 | 2,337,835 | 4,748,418 | 4.685 | 2.031 | | | |
| 10-3 | 422,567 | 2,324,090 | 4,558,326 | 5.500 | 1.961 | | | |
| 10-6 | 555,903 | 2,503,972 | 4,866,556 | 4.504 | 1.944 | | | |
| 10-7 | 573,800 | 2,606,311 | 5,137,486 | 4.542 | 1.971 | | | |
| 10-8 | 703,540 | 2,710,085 | 5,125,726 | 3.852 | 1.891 | | | |
| 10-9 | 630,851 | 2,393,363 | 4,597,628 | 3.794 | 1.921 | | | |
| 10-10 | 567,308 | 2,545,611 | 4,986,914 | 4.487 | 1.959 | | | |
| 11-1 | 532,880 | 2,551,912 | 5,033,611 | 4.789 | 1.972 | | | |
| 11-2 | 482,296 | 2,168,567 | 4,680,286 | 4.496 | 2.158 | | | |
| 11-3 | 498,212 | 2,274,154 | 4,902,267 | 4.565 | 2.156 | | | |
| 11-4 | 489,874 | 2,368,001 | 4,938,035 | 4.834 | 2.085 | | | |
| 11-5 | 436,541 | 2,527,145 | 5,225,997 | 5.789 | 2.068 | | | |
| 11-6 | 511,177 | 2,171,947 | 4,661,074 | 4.249 | 2.146 | | | |
| 11-7 | 551,146 | 2,348,289 | 4,809,928 | 4.261 | 2.048 | | | |
| 11-8 | 548,161 | 2,419,214 | 4,731,490 | 4.413 | 1.956 | | | |

Example 2

A blend of the product of Example 1 (Sample 8-3) with UHMW polyethylene having molecular weigh of $2.5 \times 10^6$ and HD polyethylene having molecular weight of $3.0 \times 10^5$ was prepared by dry-blending 100 parts by mass of a polyolefin (PO) composition comprising 1% by mass of the UHMW polyethylene, 49% by mass of the HD polyethylene, and 50% by mass of product of Example 1 (Sample 8-3), and 0.5 parts by mass of dibutylhydroxytoluene as an antioxidant. Separate measurement revealed that the polyethylene composition of this blend had a melting point of 135° C., and a crystal dispersion temperature of 90° C.

Thirty-five parts by mass of the resultant blend was charged into a strong-blending double-screw extruder having an inner diameter of 58 mm and L/D of 42, and 65 parts by mass of liquid paraffin [40 cst (40° C.)] was supplied to the double-screw extruder via a side feeder. Melt-blending was conducted at 210° C. and 200 rpm to prepare a polyolefin solution. This polyolefin solution was formed into a gel-like sheet.

Using a laboratory-stretching machine, the gel-like sheet was simultaneously biaxially stretched at 114° C., such that the stretching magnification was 5 folds in both machine direction (MD) and transverse direction (TD). The stretched membrane was fixed to an aluminum frame of 20 cm×20 cm, and immersed in methylene chloride [surface tension: 27.3 mN/m (25° C.), boiling point: 40.0° C.] controlled at 25° C., and washed with vibration of 100 rpm for 3 minutes. The resultant membrane was air-cooled at room temperature and heat-set at 125° C. for 10 minutes while being fixed to an aluminum frame, to produce a microporous membrane.

The properties of the microporous membrane of this Example were measured by the following methods.

(1) Average Thickness (μm)
  i. The thickness of the microporous membrane was measured by a contact thickness meter at 5-mm MD intervals over the width of 30 cm, averaged, and found to be 33 μm.

(2) Air Permeability (sec/100 cc/20 μm):
  i. Air permeability $P_1$ measured on the microporous membrane having a thickness $T_1$ according to JIS P8117 was converted to air permeability $P_2$ at a thickness of 20 μm by the formula of $P_2=(P_1 \times 20)/T_1$, and found to be 233 sec/100 cc/20 μm.

(3) Porosity (%):
  i. This was measured by a weight method and found to be 41%.

(4) Pin Puncture Strength (mN/20 μm):
  i. The maximum load was measured when the microporous membrane having a thickness of $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the formula of $L_2=(L_1 \times 20)/T_1$, and used as pin puncture strength. It was found to be 1893 mN/20 μm.

(5) Shutdown Temperature (° C.):

i. Using a thermo mechanical analyzer (TMA/SS6000 available from Seiko Instruments Inc.), a test piece of 10 mm (TD)×3 mm (MD) was heated from room temperature at a speed of 5° C./min, while pulling the test piece in a longitudinal direction at a load of 2 gf, and the temperature at an inflection point of sample length observed near the melting point of the test piece was defined as "shutdown temperature." It was found to be 133° C.

(6) Meltdown Temperature (° C.):

A sample of the microporous membrane of 5 cm×5 cm was sandwiched by a block having a circular opening of 12 mm in diameter, and a tungsten carbide ball of 10 mm in diameter was placed on the microporous membrane in the circular opening. While heating at a temperature-elevating speed of 5° C./minute, the temperature at which the microporous membrane was ruptured by melting was measured. It was found to be 178° C.

Comparative Example 1

A polyolefin solution having the same composition and concentration as those of the solution in Example 2, except that of propylene homopolymer having molecular weight of $8.4 \times 10^5$ and a heat of fusion of 83.9 J/g, obtained by polymerization using methyl-cyclohexyldimethoxy silane (MCMS) and tri-ethyl-aluminum (TEAL) as external electron donor and cocatalyst.

The properties of the microporous membrane of this Comparative Example were as follows.

Average thickness, air permeability, porosity, pin puncture strength, shutdown temperature and meltdown temperature were found to be 30 μm, 4830 sec/100 cc/20 μm, 25%, 4437 mN/20 μm, 133° C. and 174° C., respectively.

Example 3

TABLE 1

Lab UHMW iPP polymerization and characterization data

| Sample ID | Catalyst/ Donor[a] | Activity, g/g/hr | Mw, k[b] | Mw/ Mn | Tm, ° C. | ΔH, J/g |
|---|---|---|---|---|---|---|
| 24186-181 | C-133/DCPMS | 9584 | 2440 | 5.88 | 165.79 | 112.03 |
| 24186-182 | C-133/DCPMS | 5015 | 2400 | 5.55 | 164.62 | 108.34 |
| 24186-183 | C-135/DCPMS | 13550 | 2410 | 5.15 | 166.80 | 112.05 |
| 24186-184 | C-133/DCPMS | 6372 | 2413 | 5.28 | 164.63 | 111.78 |
| 24186-185[c] | C-135/DCPMS | 8538 | 2477 | 5.00 | 165.65 | 108.48 |
| 24186-188 | C-135/DCPMS | 14351 | 2406 | 4.64 | 167.17 | 111.55 |
| 24186-189 | C-135/DCPMS | 7756 | 2657 | 4.54 | 166.67 | 111.00 |
| 24186-190[d] | C-135/DCPMS | 16010 | 2273 | 4.53 | 167.00 | 108.81 |
| 24186-191 | C-135/DCPMS | 14680 | 2450 | 4.41 | 166.50 | 109.74 |
| 24186-192 | C-135/DCPMS | 9574 | 2145 | 4.11 | 166.76 | 108.66 |
| 24186-193 | C-135/DCPMS | 7840 | 2304 | 3.45 | 166.08 | 111.27 |
| 24186-194 | C-135/DCPMS | 10099 | | | 166.10 | 109.92 |
| 24186-195 | C-135/DCPMS | 6553 | | | 166.09 | 109.59 |

[a]DCPMS = Dicyclopentyldimethoxysilane
[b]GPC was run at 160° C.
[c]Intrinsic Viscosity = 12.28 dl/g
[d]Intrinsic Viscosity = 13.61 dl/g Example 3 demonstrates that UHMW, high crystallinity PP can be prepared using Ziegler-Natta catalyst and dicyclopentyldimethoxysilane external donor.

Propylene Polymerization

THC-C-133 and THC-C-135 are commercial Ziegler-Natta catalysts manufactured by Toho Catalyst Company. Propylene was purified by passing through reduced R3-11 copper catalyst, dehydrated R3-11 copper catalyst, dehydrated 3A molecular sieves, and dehydrated Selexsorb COS alumina columns. A 2 L Zipperclave reactor was purged under a nitrogen flow for 1 hr at 100-120° C. and then the reactor temperature was lowered to room temperature. Typically, 2-4 mL of 1.0 M Triethylaluminum solution in hexanes, 2-12 mL of 0.1 M Dicyclopentyldimethoxysilane solution in hexane and 1000 mL of propylene were added. Stirring was initiated. About 10-30 mg of solid catalyst in 5 wt % mineral oil slurry was injected into the reactor by addition of 250 mL of propylene and the reactor was heated to 60 or 70° C. in about 5 minutes. After 60 minutes from the catalyst injection, the polymerization was terminated by stopping heating and venting the volatiles.

Differential Scanning Calorimetry (DSC)

Peak melting temperature (Tm), peak crystallization temperature (Tc), and heat of fusion (ΔH) were determined using ASTM D 3418-03 as a reference. Differential scanning calorimetric (DSC) data were obtained using a PerkinElmer Instrument, model Pyris 1 DSC. Samples weighing approximately 5.5-6.5 mg were sealed in aluminum sample pans. The DSC data were recorded by first heating the sample to 200° C. at a rate of 150° C./minute, called first melt (no data recorded). The sample was kept at 200° C. for 10 minutes before a cooling-heating cycle was applied. The sample was cooled from 200° C. to 25° C. at a rate of 10° C./minute, called crystallization, and then kept at 25° C. for 10 minutes and heated to 200° C. at a rate of 10° C./minute, called second melt. The thermal events in both crystallization and second melt were recorded. The melting temperature ($T_m$) was the peak temperature of the second melting curve and the crystallization temperature ($T_c$) was the peak temperature of the crystallization peak.

What is claimed is:

1. A polymeric composition comprising greater than about 90 mole % propylene monomer, said composition having an intrinsic viscosity greater than about 10 dl/g, a heat of fusion greater than about 108 J/g, a melting point of 165° C. or greater, a molecular weight greater than about $1.5 \times 10^6$, a molecular weight distribution of from about 2.5 to about 7, a Melt Flow Rate at 230° C. of less than about 0.01 dg/minute, an amount of extractable species of 0.5 wt. % or less based on the weight of the polymeric composition, and stereo defects less than about 50 per 10,000 carbon atoms.

2. The polymeric composition of claim 1 having an mmmm pentad fraction of greater than about 96 mol % mmmm pentads.

3. The polymeric composition of claim 1 comprising greater than about 99.99 mol % propylene monomer.

4. The polymeric composition of claim 1 having a molecular weight greater than about $1.75 \times 10^6$.

5. The polymeric composition of any of claim 4 having an intrinsic viscosity greater than about 11 dl/g, a heat of fusion greater than about 110 J/g, a melting point of 166° C. or greater, a molecular weight greater than about $1.5 \times 10^6$, a molecular weight distribution of from about 2.5 to about 7, a Melt Flow Rate at 230° C. of less than about 0.01 dg/minute, and stereo defects less than about 40 per 10,000 carbon atoms.

6. The polymeric composition of claim 5 comprising greater than about 95 mole % propylene monomer.

7. The polymeric composition of claim 5 comprising greater than about 99.99 mole % propylene monomer.

8. The polymeric composition of claim 5 having a molecular weight greater than about $2.0\times10^6$.

9. The polymeric composition of claim 8 and a second polyolefin.

10. A composition comprising polyethylene and a propylene polymer composition comprising greater than about 90 mole % propylene monomer, said propylene polymer composition having an intrinsic viscosity greater than about 10 dl/g, a heat of fusion greater than about 108 J/g, a melting point of 165° C. or greater, a molecular weight greater than about $1.5\times10^6$, a molecular weight distribution of from about 2.5 to about 7, a Melt Flow Rate at 230° C. of 0.2 dg/minute or less, and stereo defects less than about 50 per 10,000 carbon atoms.

11. The composition of claim 10 wherein the polyethylene comprises a first polyethylene having a molecular weight of $5\times10^5$ or more, a second polyethylene having a molecular weight of $1\times10^4$ or more and less than $5\times10^5$, or both the first and second polyethylenes.

12. The composition of claim 11, wherein the first polyethylene comprises ultra high molecular weight polyethylene and the second polyethylene comprises at least one of high-density polyethylene, medium-density polyethylene, branched low-density polyethylene, and linear low-density polyethylene.

13. The composition of claim 11 wherein the ultra high molecular weight polyethylene is an ethylene homopolymer or an ethylene/α-olefin copolymer containing a small amount of an α-olefin other than ethylene.

14. The composition of claim 10 wherein the propylene polymer composition has an intrinsic viscosity greater than about 11 dl/g, a heat of fusion greater than about 110 J/g, a melting point of 166° C. or greater, a molecular weight greater than about $1.5\times10^6$, a molecular weight distribution of from about 2.5 to about 7, a Melt Flow Rate at 230° C. of less than about 0.01 dg/minute, an amount of extractable species of 0.5 wt. % or less based on the weight of the propylene polymer composition, and stereo defects less than about 40 per 10,000 carbon atoms.

15. A microporous membrane comprising the composition of claim 10.

16. A battery comprising an anode, a cathode, an electrolyte, and the microporous membrane of claim 15, wherein the microporous membrane is located at least between the anode and the cathode.

* * * * *